Dec. 20, 1938.  H. HIRAM  2,140,699
SIGNALING DEVICE
Filed May 25, 1938  3 Sheets-Sheet 1
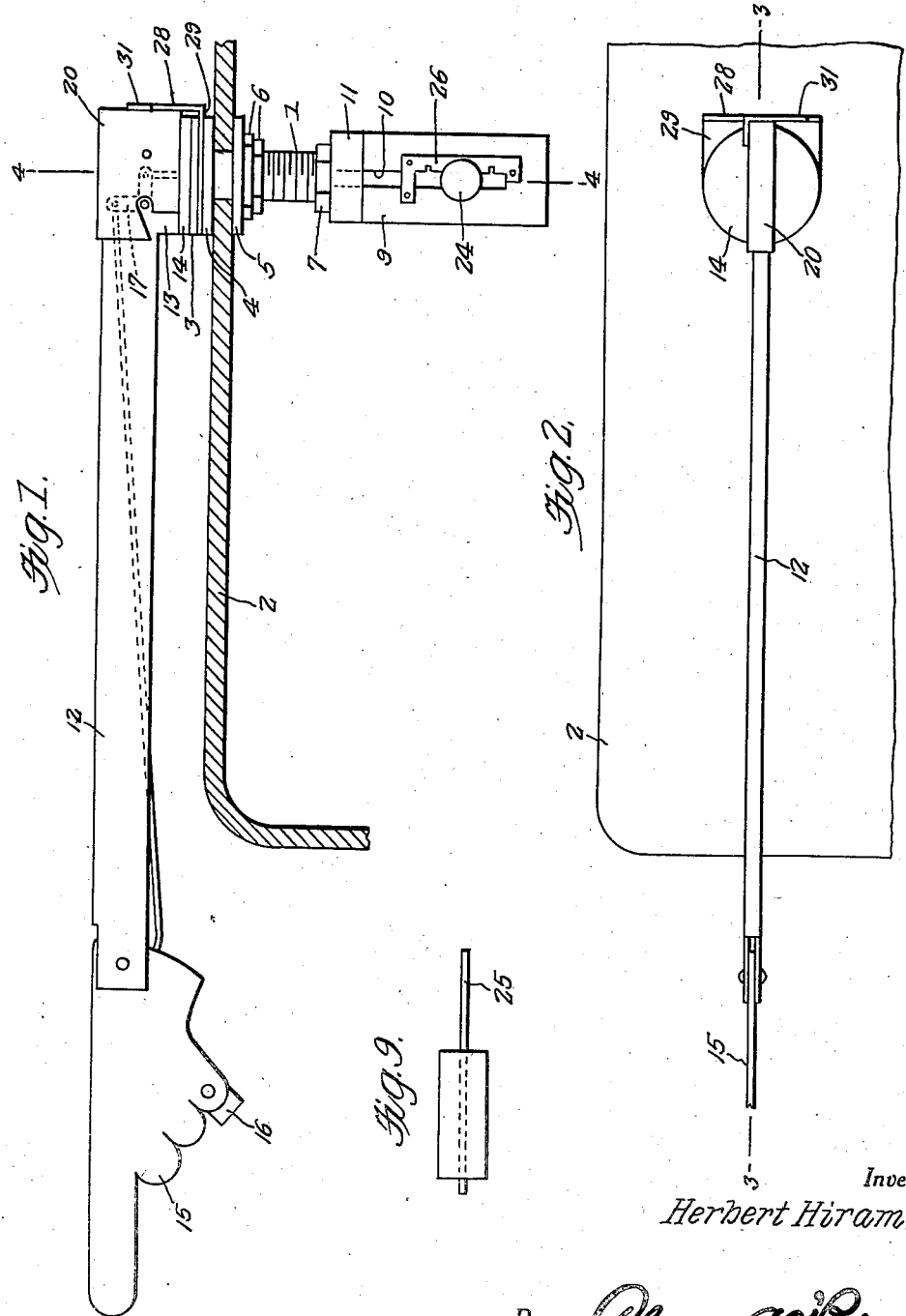
Inventor
*Herbert Hiram,*
By *Clarence A. O'Brien
and Hyman Berman*
Attorneys

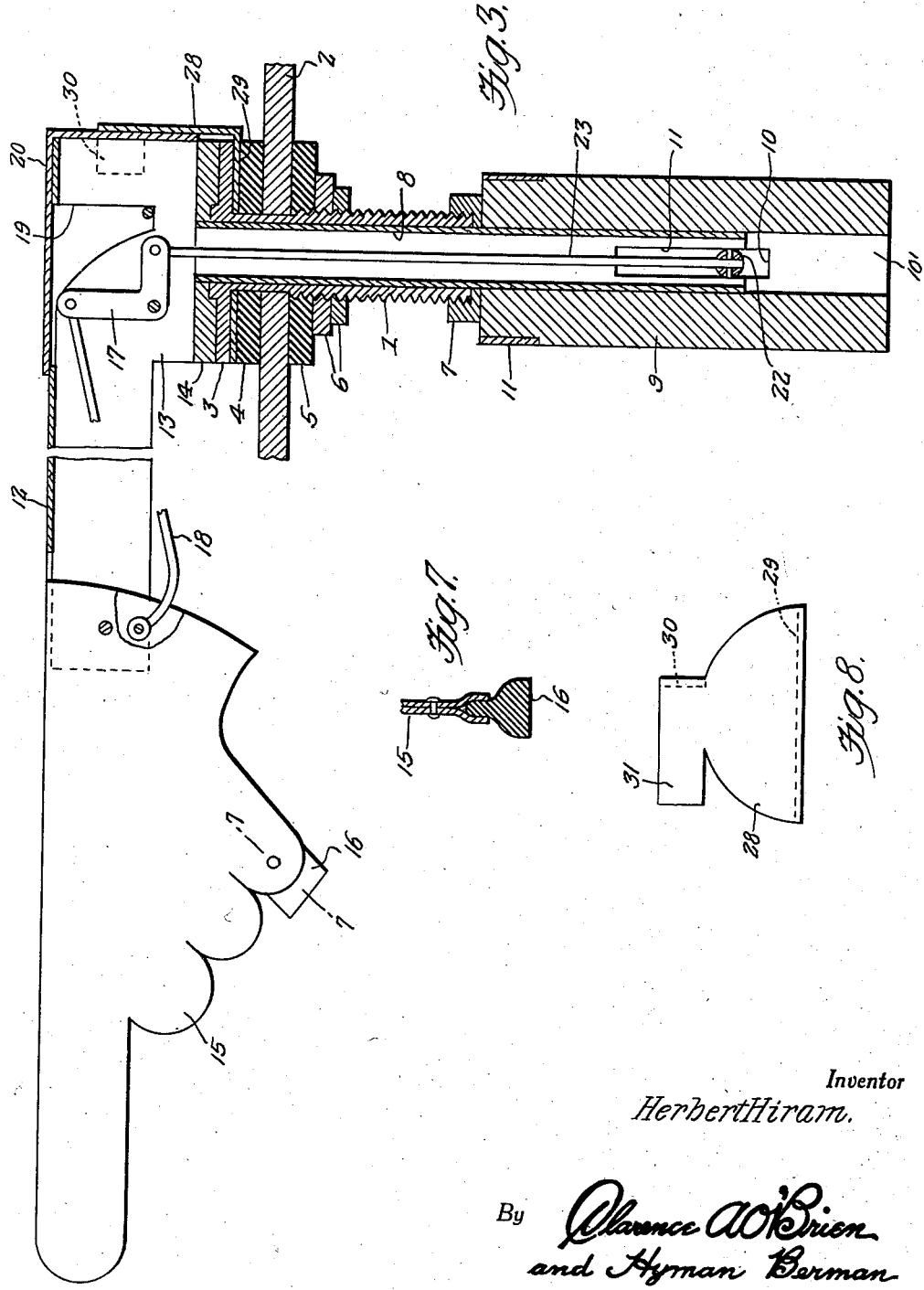

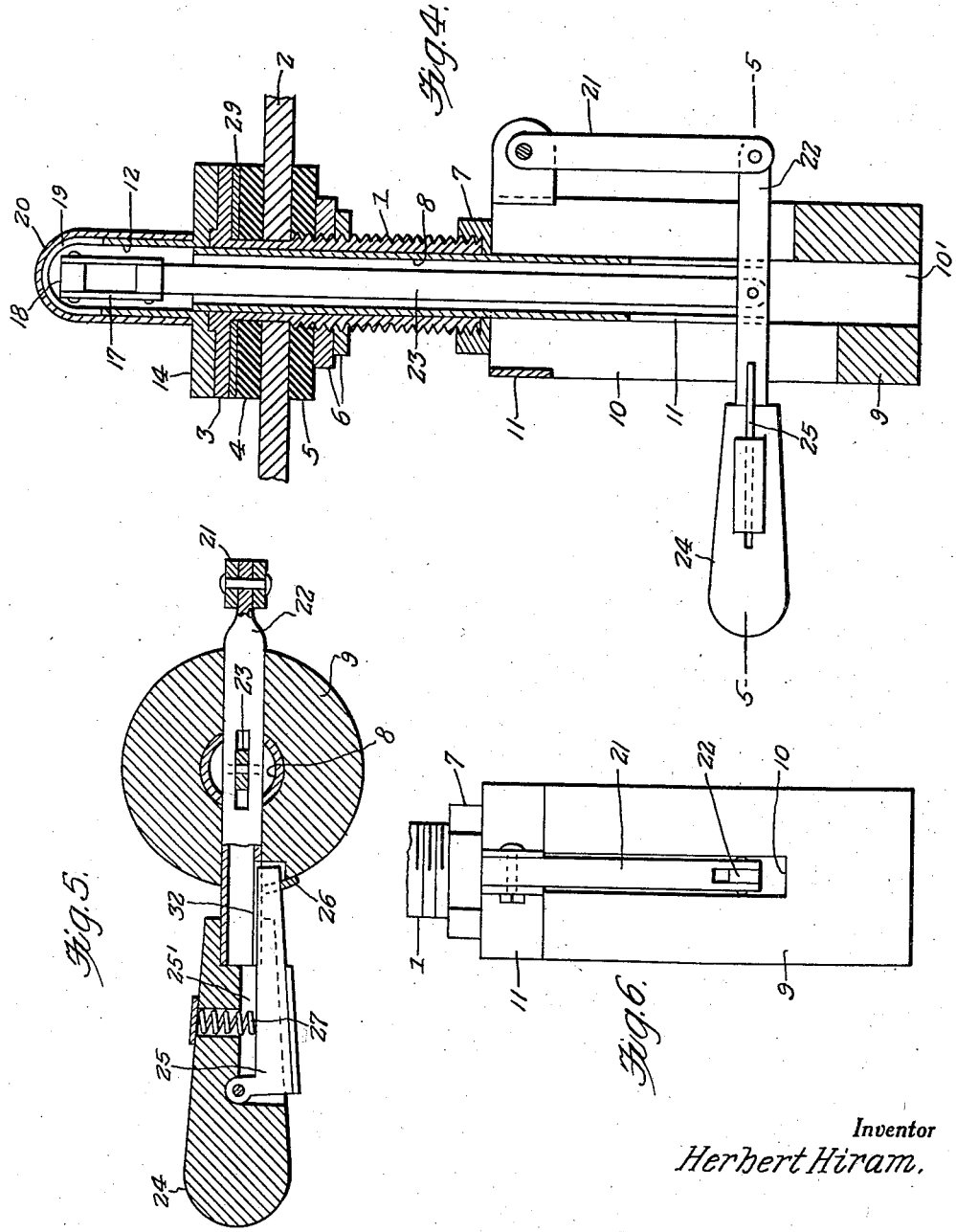

Patented Dec. 20, 1938

2,140,699

UNITED STATES PATENT OFFICE 2,140,699

SIGNALING DEVICE

Herbert Hiram, Petaluma, Calif.

Application May 25, 1938, Serial No. 210,050

3 Claims. (Cl. 116—47)

The present invention relates to new and useful improvements in signaling devices for automobiles and has for its primary object to provide, in a manner as hereinafter set forth, a device of this character embodying a novel construction, combination and arrangement of parts whereby the driver of the vehicle may conveniently indicate his intention to make a right or left turn, stop, etc., without the necessity of lowering a window.

Another very important object of the invention is to provide a signal of the aforementioned character which is mounted on top of the automobile and which may be conveniently operated with one hand from the driver's seat of the vehicle.

Still another very important object of the invention is to provide, in an automobile signaling device of the type including a swinging indicator, novel means for actuating said swinging indicator to different positions for indicating when a right turn, a left turn or a stop is to be made.

Other objects of the invention are to provide a signaling device of the character described which will be comparatively simple in construction, strong, durable, highly efficient and reliable in use, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an embodiment of the invention, showing the device in operative position, a portion of the roof or top of an automobile body being shown in section.

Figure 2 is a view in top plan thereof.

Figure 3 is a view in vertical section, taken substantially on the line 3—3 of Fig. 2.

Figure 4 is a vertical sectional view, taken substantially on the line 4—4 of Fig. 1.

Figure 5 is a view in horizontal section, taken substantially on the line 5—5 of Fig. 4.

Figure 6 is an elevational view of the lower portion of the device.

Figure 7 is a detail view in section, taken substantially on the line 7—7 of Fig. 3.

Figure 8 is a detail view in elevation of the member which controls and limits the swinging movement of the arm.

Figure 9 is a detail view in perspective of the lever securing latch.

Referring now to the drawings in detail, it will be seen that the embodiment of the invention which has been illustrated comprises a metallic sleeve 1 which is mounted vertically in an opening provided therefor in the front portion of the top 2 of an automobile body The sleeve 1 includes a smooth upper end portion provided with an integral flange 3, the lower portion of said sleeve being threaded Rubber gaskets 4 and 5 are provided on the sleeve 1 above and below the top 2 for preventing leakage around said sleeve Nuts 6 are threaded on the sleeve 1 for clamping the rubber gaskets 4 and 5. A nut 7 is also threaded on the lower end portion of the sleeve 1.

Journalled in the sleeve 1 is a tubular shaft 8. The tubular shaft 8 extends below the lower end of the sleeve 1 and mounted thereon is a handle 9 of suitable material. The handle 9 is provided with a central bore 10 which accommodates the tubular shaft 8. Also, the upper portion of the handle 9 is split in a manner to provide slots 10. A clamp 11 on the upper portion of the handle 9 secures said handle to the tubular shaft 8. The lower end portion of the tubular shaft 8 has formed therein slots 11 which communicate with the slots 10.

The reference numeral 12 designates a swinging arm of suitable metal, said arm being substantially U-shaped in cross section. The arm 12 comprises an enlarged inner end portion 13 the bottom of which includes a metallic disk 14 which is fixed on the upper end portion of the tubular shaft 8 and which is adapted to rotate on the flange 3 of the sleeve 1. Mounted for swinging movement in a vertical plane on the free end portion of the arm 12 is an indicator 15 in the form of a pointing hand. If desired, the indicator 15 may be outlined with reflecting buttons or said indicator may be illuminated in any suitable manner. A bumper 16 is provided on the lower portion of the indicator 15 for supporting same on the top 2 of the vehicle when in inoperative position.

Pivotally mounted for swinging movement in the inner end portion 13 of the arm 12 is a pair of bell crank levers 17. A rod 18 connects the indicator 15 to the bell crank levers 17 for actuation thereby. An opening 19 is provided in the inner end portion 13 of the arm 12 for permitting access to be had to the bell crank levers 17 and the adjacent elements. It may be well to here state that the rod 18 is operable in the substantially U-shaped arm 12. A removable closure 20 is provided for the rear end portion 13 of the arm 12 and opening 19 therein.

Mounted for swinging movement on the clamp 11 and depending therefrom adjacent the handle 9 is a link 21. The reference numeral 22 designates a hand lever having one end pivotally connected to the lower end portion of the link 21, said lever being operable in the slots 10 and 11 of the handle 9 and the tubular shaft 8, respectively. A rod 23 operatively connects the lever 22 to the bell crank lever 17. The rod 23 is operable in the tubular shaft 8 and said rod is connected to the lever 22 at an intermediate point.

The lever 22 has mounted on the free end portion thereof a handle 24. As best seen in Fig. 5 of the drawings, the lever 22 is tubular. Pivotally mounted in a recess 25' which is provided therefor in the handle 24 is a latch 25. The latch 25 is engageable in a notched keeper 26 on the handle 9 for releasably securing the lever 22 in the different signaling positions. A spring 27 in the handle 24 engages the latch 25 with the keeper 26.

It is thought that the operation of the device will be readily apparent from a consideration of the foregoing. When not in use, the arm 12 extends longitudinally of the vehicle, the indicator 15 resting on the top 2 of said vehicle, the bumper 16 preventing scratching of said top. When the signal is to be used, the operator, sitting behind the steering wheel of the vehicle, reaches up with one hand and conveniently turns the handle 9 and the tubular shaft 8 in a manner to swing the arm 12 approximately one quarter of a revolution out over the left hand side of the top of the vehicle, as seen in Figs. 1 and 2 of the drawings. Then, by operating the lever 22, the indicator 15 may be swung to and secured in lowered position, a horizontal position or raised position. Raised position of the member 15 indicates that a right turn is contemplated, the lower position of said member 15 indicates that a stop is to be made, while the horizontal position of said member, as shown in the drawings, indicates that a left turn is contemplated. A stop member 28 is provided on the sleeve 1 for limiting the swinging movement of the arm 12 to approximately one quarter of a circle. The member 28 is of suitable resilient metal and comprises a base 29 which is secured on the sleeve 1 below the flange 3. The member 28 further includes a right angle stop or ear 30 which limits the swinging movement of the arm 12 toward operative or signaling position. The member 28 further includes a longitudinal ear 31 which limits the return movement of the arm 12. Of course, to actuate the lever 22, the latch 25 is pressed inwardly out of engagement with the keeper 26 against the tension of the coil spring 27. As seen in Fig. 5 of the drawings, the free end portion of the lever 22 is provided with a longitudinal slot 32 which accommodates the free end portion of the latch 25.

It is believed that the many advantages of a signaling device constructed in accordance with the present invention will be readily understood and although a preferred embodiment of said device is as illustrated and described, it is to be understood that changes in the details of construction and in the combination and arrangement of parts may be resorted to which will fall within the scope of the invention as claimed.

What is claimed is:—

1. A signal of the class described comprising a sleeve mounted vertically in the top of an automobile, a tubular shaft rotatably mounted in said sleeve, a hollow arm fixed on the upper end portion of said shaft, an indicator pivotally mounted on the free end portion of said arm, a hand lever pivotally mounted on the lower portion of the shaft, and means operatively connecting the indicator to said lever for actuation thereby, said means including a bell crank lever pivotally mounted in the inner end portion of the arm, a rod operatively connecting said bell crank lever to the indicator, and another rod, operable in the tubular shaft, operatively connecting the hand lever to said bell crank lever.

2. A signaling device of the class described comprising a sleeve mounted vertically in the top of an automobile, means for securing said sleeve in position, a tubular shaft rotatably mounted in the sleeve, a handle secured on the lower portion of said tubular shaft, said handle and tubular shaft having communicating vertical slots therein, a clamp on the upper portion of the handle securing same to the tubular shaft, a link connected to said clamp and depending therefrom, a lever pivotally connected to said link and operable in the slots in the tubular shaft and the handle, an arm fixed on the upper end portion of the tubular shaft for swinging movement in a horizontal plane, an indicator pivotally mounted on the free end portion of said arm for swinging movement in a vertical plane, and means operatively connecting said indicator to the lever for actuation thereby.

3. A signaling device of the class described comprising a sleeve mounted vertically in the top of an automobile, means for securing said sleeve in position, a tubular shaft rotatably mounted in the sleeve, a handle secured on the lower portion of said tubular shaft, said handle and tubular shaft having communicating vertical slots therein, a clamp on the upper portion of the handle securing same to the tubular shaft, a link connected to said clamp and depending therefrom, a lever pivotally connected to said link and operable in the slots in the tubular shaft and the handle, a hollow arm fixed on the upper end portion of the tubular shaft for swinging movement in a horizontal plane, an indicator pivotally mounted on the free end portion of said arm for swinging movement in a vertical plane, and means operatively connecting said indicator to the lever for actuation thereby, said means including a bell crank lever pivotally mounted in the inner end portion of the arm, a rod operatively connecting the indicator to one end of said bell crank lever, and a rod operable in the tubular shaft and operatively connecting the other end of the bell crank lever to the first named lever.

HERBERT HIRAM.